United States Patent Office 2,747,800
Patented May 29, 1956

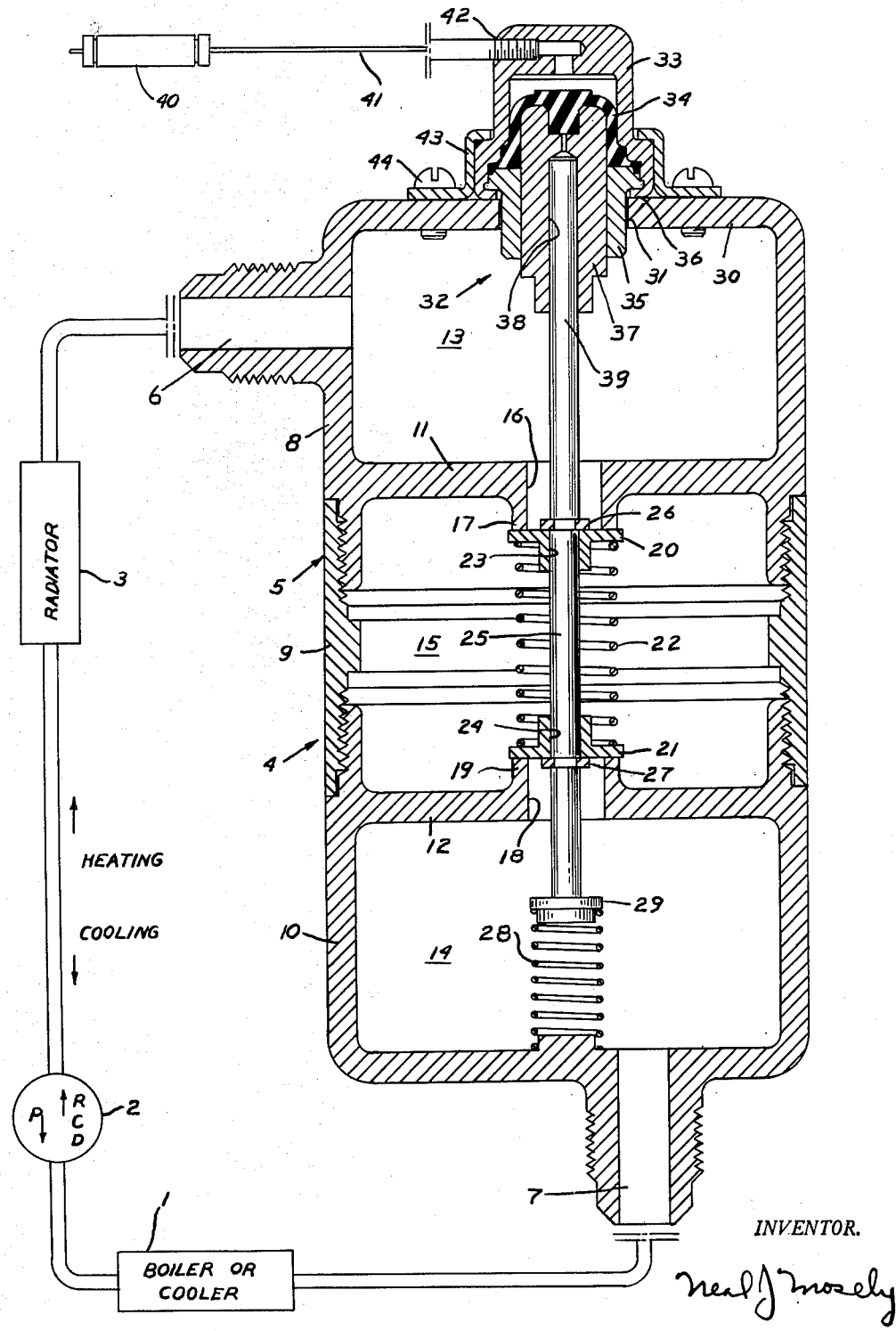

2,747,800

HEATING AND COOLING SYSTEM AND CONTROL VALVE THEREFOR

Neal J. Mosely, Mt. Lebanon, Pa., assignor to Detroit Controls Corporation, a corporation of Michigan Application July 31, 1952, Serial No. 301,947

6 Claims. (Cl. 236—1)

This invention relates to new and useful improvements in heating and cooling systems and in a novel control valve for such systems.

One of the objects of this invention is to provide a new and improved heating and cooling system in which the flow of heating or cooling fluid is automatically controlled and in which the fluid circulates in one direction during the heating operation and in the opposite direction during the cooling operation.

Another object of this invention is to provide a new and improved thermostatic control valve for a heating or cooling system which is operable to control the flow of heating or cooling fluid according to the direction of flow of said fluid.

Another object is to provide a thermostatic control valve for a heating or cooling system which is simply and inexpensively constructed and installed for operation.

Other objects will become apparent from time to time throughout the specification and claims as hereinafter related.

This invention comprises the new and improved construction, combination of parts, and their operating relation one to another, both in the control valve and in the system in which said valve is installed, which will be described more fully hereinafter and the novelty of which will be particularly pointed out and distinctly claimed.

In the accompanying drawing, to be taken as a part of this specification, there is clearly and fully illustrated a preferred embodiment of this invention in which drawing:

The figure shown is a diagrammatic view of a heating and cooling system with the control valve therefor shown in longitudinal central section.

Referring to the drawing by numerals of reference, there is shown a heating or cooling system comprising a source of heating or cooling fluid such as a boiler or cooler designated by the numeral 1, a reversible fluid circulating pump 2, a radiator or heat exchanger 3, and a control valve 4, all connected in series circuit. The pump 2 is a reversible pump and is arranged to circulate heating fluid in a clockwise direction through the circuit for heating operation and is reversed to circulate cooling fluid in a counterclockwise direction through the circuit for cooling operation. The valve 4 comprises a hollow casing 5 having inlet 6 at one end and outlet 7 at the other end. The casing 5 comprises three sections, 8, 9, and 10, respectively, and has interior walls 11 and 12 dividing the same into end chambers 13 and 14 and a central chamber 15. The wall 11 has a valve port 16 therein with a valve seat 17 facing inwardly of the central chamber 15. The wall 12 similarly has a valve port 18 therein with a valve seat 19 facing inwardly of the central chamber 15.

Within the chamber 15, there is a pair of valve members 20 and 21 which close against the valve seats 17 and 19, respectively, and which are urged to closed position by a spring 22 which seats at its opposite ends on said valve members. The valve members 20 and 21 have aligned central apertures 23 and 24, respectively, through which extends an operating rod 25. The rod 25 has a pair of abutments or ring members 26 and 27 thereon which engage the valve members 21 and 22, respectively, when the valve members are in closed position and the operating rod 25 is in a predetermined position. The valve members 20 and 21 are slidable along the rod 25 in response to fluid flow and so function as check valves checking the flow of fluid in opposite directions. In the outlet end chamber 14, there is provided a spring 28 which engages the end portion 29 of the rod 25 and urges the same in a direction tending to close the valve port 16 and open the valve port 18. The end wall 30 of the inlet end chamber 13 has an aperture 31 therein through which extends the operating mechanism of a thermostatic power element 32. The power element 32 comprises a hollow casing 33 which is closed by a flexible rubber diaphragm 34. The diaphragm 34 is held in position by a tubular guide member 35 and an inturned flange 36 on the casing 33. The tubular guide member 35 guides a piston 37 which is reciprocally movable therein by the diaphragm 34 and which receives in a hollow recess 38 the upper end portion 39 of the valve operating rod 25. The power element 32 includes a remotely positioned bulb element 40 which is connected to the casing 33 by a capillary tube 41 as indicated at 42. The bulb element 40, capillary tube 41, and casing 33 are charged with a suitable thermostatic fluid so that the bulb element 40 may actuate the valve in response to the temperature of the space being heated or cooled by this system. The power element 32 is secured in position by a bracket 43 and a plurality of screws or bolts 44.

*Operation*

The system which has been just described is one in which the heating fluid is circulated in one direction for heating operation and then when the system is changed to cooling operation, the cooling fluid is circulated in the opposite direction. The valve which has been described is one which will control automatically in response to temperature of the space being heated or cooled the flow of heating or cooling fluid in accordance with the direction of flow of said fluid. When this system is operating on a heating cycle, the heating fluid circulates in a clockwise direction through the radiator 3 and into the inlet 6 of the thermostatic valve 4. The fluid which enters the inlet 6 flows through the chamber 13 and moves the valve member 20 away from the valve seat 17, the valve sliding along the operating rod 25 and functioning as a check valve. The fluid which passes the valve member 20 is controlled by the position of the valve member 21 relative to its valve seat 19. When temperature of the space being heated is below the set temperature at which both valves are closed, the operating rod 25 will have moved upward in response to contraction of the thermostatic fluid in the power element 32. This upward movement of the rod 25 will cause the abutment 27 to engage and move the valve member 21 to open position which will permit flow of the heating fluid through the port 18 and out through the outlet 7 which is connected back to the boiler 1. As the temperature of the space being heated increases, the valve member 21 will move to closed position and upon a further increase in temperature, the valve operating rod will have a lost motion through the apertuer 24 in the valve member 21 and will cause the valve memebr 20 to be held in an open position independent of flow of fluid through the valve.

When the system is changed to cooling operation, the reversible pump 2 is reversed in operation to circulate the cooling fluid in a counterclockwise direction through the circuit. During such cooling operation, the outlet 7 of the valve 4 becomes its inlet and the inlet 6 becomes an outlet. During such cooling operation, the cooling fluid enters the valve at the inlet 7, passes the valve member 21 as a check valve in the manner which was described in connection with valve 20 during heating operation. The valve 20 during this operation becomes the valve which is controlled by the thermostatic power element 32 through its movement of the operating rod 25 and the abutment 26 which engages the valve member. Upon increases of temperature above the temperature of response of the power element 32, the rod 25 and abutment 26 are moved downward, thus moving the valve member 20 to open position and permitting flow of cooling fluid through the outlet 6 to the radiator 3 for cooling operation.

From the foregoing description, it is seen that there is provided herein a heating and cooling system in which the control during heating or cooling operation is effected in accordance with the direction of flow of the heating or cooling fluid. The valve which effects this control has two separately controlled valve members therein, both of which function as check valves to check the flow of fluid in opposite directions. During a heating operation, one of the valves functions as a check valve and the other valve is controlled by the thermostatic operator to modulate the flow of heating fluid. During cooling operation, the direction of flow of heat exchange fluid is reversed and the valve which operated as a check valve during heating operation becomes the control valve under the influence of the thermostatic operator, while the valve which was previously operated thermostatically becomes a check valve.

Although there has been illustrated only one preferred embodiment of this invention, it will be apparent to those skilled in the art that other modifications are possible without departing from the scope and intent of this invention which will be limited only by the scope of the appended claims.

Having thus described the invention, what is claimed and is desired to be secured by Letters Patent of the United States is:

1. In a thermostatic valve, a valve casing having a pair of fluid flow openings therethrough, a pair of valve seats rigidly positioned within said casing and spaced longitudinally of said casing to provide a pair of serially spaced valve ports, said valve seats facing each other within said casing, valve members cooperable one with each of said valve ports to provide simultaneous check valves for controlling flow in opposite directions through said casing, spring means urging each of said valve members against its seat, and a thermostatic operator engageable with and operable to open one of said valve members upon increase in temperature above a predetermined value and the other of said valve members upon decrease in temperature below said predetermined value.

2. In a thermostatic valve, a hollow valve casing having a first fluid flow opening at one end and a second fluid flow opening at the other end, two walls within said casing dividing the same into two end chambers and a central chamber, said walls having aligned valve seats facing into said central chamber providing valve ports for flow of fluid therethrough, a pair of valve members in said central chamber cooperable one with each of said valve seats, a spring positioned between and engaging each of said valve members and urging the same toward closed position, said valve members having aligned central apertures therein, an operating rod slidably positioned in said valve member apertures, a pair of abutments on said rod on the end chamber sides of each of said valve members, said rod being operable upon movement in one direction to engage one of said abutments with one of said valve members to move the same toward open position and upon movement in the opposite direction to engage the other abutment with the other valve member to move the same toward open position, and thermostatic means for moving said rod in one direction upon increase in temperature and in the opposite direction upon decrease in temperature.

3. In a thermostatic valve, a hollow valve casing having a first fluid flow opening at one end and a second fluid flow opening at the other end, two walls within said casing dividing the same into two end chambers and a central chamber, said walls having aligned valve seats facing into said central chamber providing valve ports for flow of fluid therethrough, a pair of valve members in said central chamber cooperable one with each of said valve seats, a spring positioned between and engaging each of said valve members and urging the same toward closed position, said valve members having aligned central apertures therein, an operating rod slidably positioned in said valve member apertures, said valve members being movable along said rod by fluid flow to function as check valves checking flow in opposite directions, a pair of abutments on said rod on the end chamber sides of each of said valve members, said abutments each engaging its respective valve member when said valve members are in closed position and said rod is in a predetermined position, said rod being operable upon movement in one direction from said predetermined position to cause one of said abutments to move one of said valve members toward open position and upon movement in the opposite direction from said predetermined position to cause the other of said abutments to move said other valve member toward open position, and thermostatic means for moving said rod in one direction upon increase in temperature and in the opposite direction upon decrease in temperature.

4. In a heating and cooling system, a source of heating heating or cooling fluid, and a heat exchanger connected in circuit; means for circulating a heating fluid to said heat exchanger in one direction for heating operation and a cooling fluid in the opposite direction for cooling operation; a thermostatic valve for controlling flow of said heating or cooling fluid and comprising a valve casing having a pair of fluid flow openings connected in said circuit, a pair of valve seats rigidly positioned within said casing, a pair of check valves operable to seat on said valve seats and simultaneously check flow in opposite directions, and a thermostatic operator connected for response to the temperature of the space being heated or cooled and operable upon increase of temperature to open the check valve opposing flow of fluid in the direction of the cooling circuit and upon decrease in temperature to open the check valve opposing flow of fluid in the direction of the heating circuit.

5. In a heating and cooling system, a source of heating or cooling fluid, and a heat exchanger connected in circuit; means for circulating a heating fluid to said heat exchanger in one direction for heating operation and a cooling fluid in the opposite direction for cooling operation; a thermostatic valve for controlling flow of said heating or cooling fluid and comprising a valve casing having a pair of fluid flow openings connected in said circuit, a pair of valve seats rigidly positioned within said casing and spaced longitudinally of said casing to provide a pair of serially spaced valve ports, said valve seats facing each other within said casing, valve members cooperable one with each of said valve ports to provide simultaneously check valves for controlling flow in opposite directions through said casing, spring means urging each of said valve members against its seat, and a thermostatic operator connected for response to the temperature of the space being heated or cooled and operable upon increase of temperature to engage and open the check valve opposing flow of fluid in the direction of the cooling circuit and upon decrease in temperature to engage and open the check valve opposing flow of fluid in the direction of the heating circuit.

6. In a heating and cooling system, a source of heating or cooling fluid, and a heat exchanger connected in circuit; means for circulating a heating fluid to said exchanger in one direction of heating operation and a cooling fluid in the opposite direction for cooling operation; a thermostatic valve for controlling flow of said heating or cooling fluid and comprising a hollow valve casing having a first fluid flow opening at one end and a second fluid flow opening at the other end connected in said circuit, two walls within said casing dividing the same into two end chambers and a central chamber, said walls having aligned valve seats facing into said central chamber providing valve ports for flow of fluid therethrough, a pair of valve members in said central chamber cooperable one with each of said valve seats, a spring positioned between and engaging each of said valve members and urging the same toward closed position, said valve members having aligned central apertures therein, an operating rod slidably positioned in said valve member apertures, said valve members being movable along said rod by fluid flow to function as check valves checking flow in opposite directions, a pair of abutments on said rod on the end chamber sides of each of said valve members, said abutments each engaging its respective valve member when said valve members are in closed position and said rod is in a predetermined position, said rod being operable upon movement in one direction from said predetermined position to cause one of said abutments to move one of said valve members toward open position and upon movement in the opposite direction from said predetermined position to cause the other of said abutments to move said other valve member toward open position, and thermostatic means responsive to the temperature of the space being heated or cooled for moving said rod in one direction upon increase in temperature and in the opposite direction upon decrease in temperature.

References Cited in the file of this patent
UNITED STATES PATENTS 2,495,272   Lum _____ Jan. 24, 1950
2,539,194   Knaus _____ Jan. 23, 1951